United States Patent
Marcacci

(10) Patent No.: US 7,334,667 B2
(45) Date of Patent: Feb. 26, 2008

(54) SELECTIVE ACTUATION DEVICE

(75) Inventor: Maurizio Marcacci, Leghorn (IT)

(73) Assignee: Piaggio & C. S.p.A., Pontedera Pisa (IT)

( * ) Notice: Subject to any disclaimer, the term of this patent is extended or adjusted under 35 U.S.C. 154(b) by 283 days.

(21) Appl. No.: 11/182,644

(22) Filed: Jul. 15, 2005

(65) Prior Publication Data

US 2006/0017318 A1    Jan. 26, 2006

(30) Foreign Application Priority Data

Jul. 20, 2004   (IT)   .......................... MI2004A1452

(51) Int. Cl.
*F16D 65/36*   (2006.01)
(52) U.S. Cl. .................. 188/156; 188/166; 188/2 D; 188/300; 280/5.502; 280/5.506; 280/124.106
(58) Field of Classification Search .............. 188/156, 188/166, 177, 173, 2 D, 300; 280/5.502, 280/5.506, 124.106
See application file for complete search history.

(56) References Cited

U.S. PATENT DOCUMENTS

| | | | | |
|---|---|---|---|---|
| 4,651,852 A | * | 3/1987 | Wickham et al. ............... | 477/4 |
| 4,715,483 A | * | 12/1987 | Hobson et al. .......... | 192/219.2 |
| 4,923,055 A | * | 5/1990 | Holland ....................... | 187/287 |
| 5,092,432 A | * | 3/1992 | Taig ............................ | 188/72.3 |
| 5,180,038 A | * | 1/1993 | Arnold et al. ............... | 188/171 |
| 5,967,939 A | | 10/1999 | Reik et al. | |
| 6,459,182 B1 | * | 10/2002 | Pfann et al. ................... | 310/77 |
| 6,598,885 B2 | * | 7/2003 | Delorenzis et al. ...... | 280/5.507 |
| 6,609,595 B2 | * | 8/2003 | Flynn et al. ................ | 188/156 |
| 6,666,305 B1 | * | 12/2003 | Vohla ......................... | 188/58 |
| 6,668,982 B2 | * | 12/2003 | LaGarde et al. ............ | 188/171 |
| 6,722,477 B1 | * | 4/2004 | Wolfsteiner et al. ....... | 188/72.9 |
| 7,137,311 B1 | | 11/2006 | Neubauer et al. | |
| 2003/0094057 A1 | | 5/2003 | Bigi | |
| 2004/0079598 A1 | * | 4/2004 | Grundwurmer et al. .... | 188/166 |
| 2005/0016799 A1 | * | 1/2005 | Severinsson ................ | 188/156 |

FOREIGN PATENT DOCUMENTS

| | | |
|---|---|---|
| DE | 198 22 667 A1 | 12/1998 |
| EP | 1155950 A2 | 11/2001 |
| WO | WO 02/068228 A1 | 9/2002 |

OTHER PUBLICATIONS

European Search Report, Aug. 17, 2007.

* cited by examiner

*Primary Examiner*—Devon Kramer
(74) *Attorney, Agent, or Firm*—Hedman & Costigan P.C.; James V. Costigan

(57) ABSTRACT

Selective actuation device (1) including an actuator (5) operating on an actuation mechanism (2). The mechanism (2) is equipped with at least one shaft (7) connected to a pusher element (8) to actuate a first operating group (12, 13) and with a rotating element (53) that moves between an activation mode, in which said element (53) acts on a second operating group (9, 10), and a rest mode where the activation of the first operating group (12, 13) is disengaged by the second operating group (9, 10).

8 Claims, 5 Drawing Sheets

SELECTIVE ACTUATION DEVICE

The present invention relates to an actuation device, and in particular, a brake actuation device and vehicle blocking devices.

It is well known that currently, a considerable diversification of models have been proposed in the vehicle field, in particular, there is a growing interest in "hybrid" vehicles that blend the details of a motorcycle, in terms of manageability, to the stability of four-wheel vehicles.

Such models are, for example, three-wheel vehicles equipped with two-front-wheel steering and four-wheel vehicles known as QUAD.

In these increasingly complex vehicles, it is necessary to foresee various intercorrelated operating groups such as anti-roll systems, suspension stroke stop devices and parking brakes.

It is, in fact, possible that during some manoeuvres, for example during provisional stops during parking and at traffic lights, not only wheel brakes, but suspension strokes must also be blocked to avoid loss of balance that may cause the driver to fall.

Whereas, during the normal functioning of the vehicle, it is necessary that the brakes can be actuated independently of any other group.

In view of the above, it is clear that it is necessary to dispose of a selective actuation device that can control, on its own and in function of the user's various needs, the connection and/or disconnection of various operating groups such as the rear wheel parking brake, the suspension stroke stop device and an anti-roll system.

An object of the present invention is, therefore, that of solving known art problems by providing a safe and reliable selective actuation device and that guarantees the vehicle's stability during all running conditions of the same.

Another object of the present invention is that of providing a selective actuation device that is both simple and inexpensive to produce.

The selective actuation device satisfies these and other objects, according to the present invention, which has the characteristics listed in attached claim 1.

The subsequent claims show further features of the invention.

Substantially, a selective actuation device according to the present invention is of the type equipped with at least one actuator that operates on a actuation mechanism. The latter being equipped with at least one pusher element for activating a first operating group and with a rotating element, that moves between an activation mode, in which it acts on a second operating group, and a rest mode where the activation of the first operating group is disengaged by the second operating group.

Such actuation device is characterised in that it comprises at least an elastic means interposed between the pusher element and the actuator in order to keep the actuation device constantly charged.

Further characteristics and advantages of the present invention will be clearer after the following description, which is not meant to be limitative and is provided for the sole scope of illustration, with reference to the attached drawings, wherein.

Figure 1:
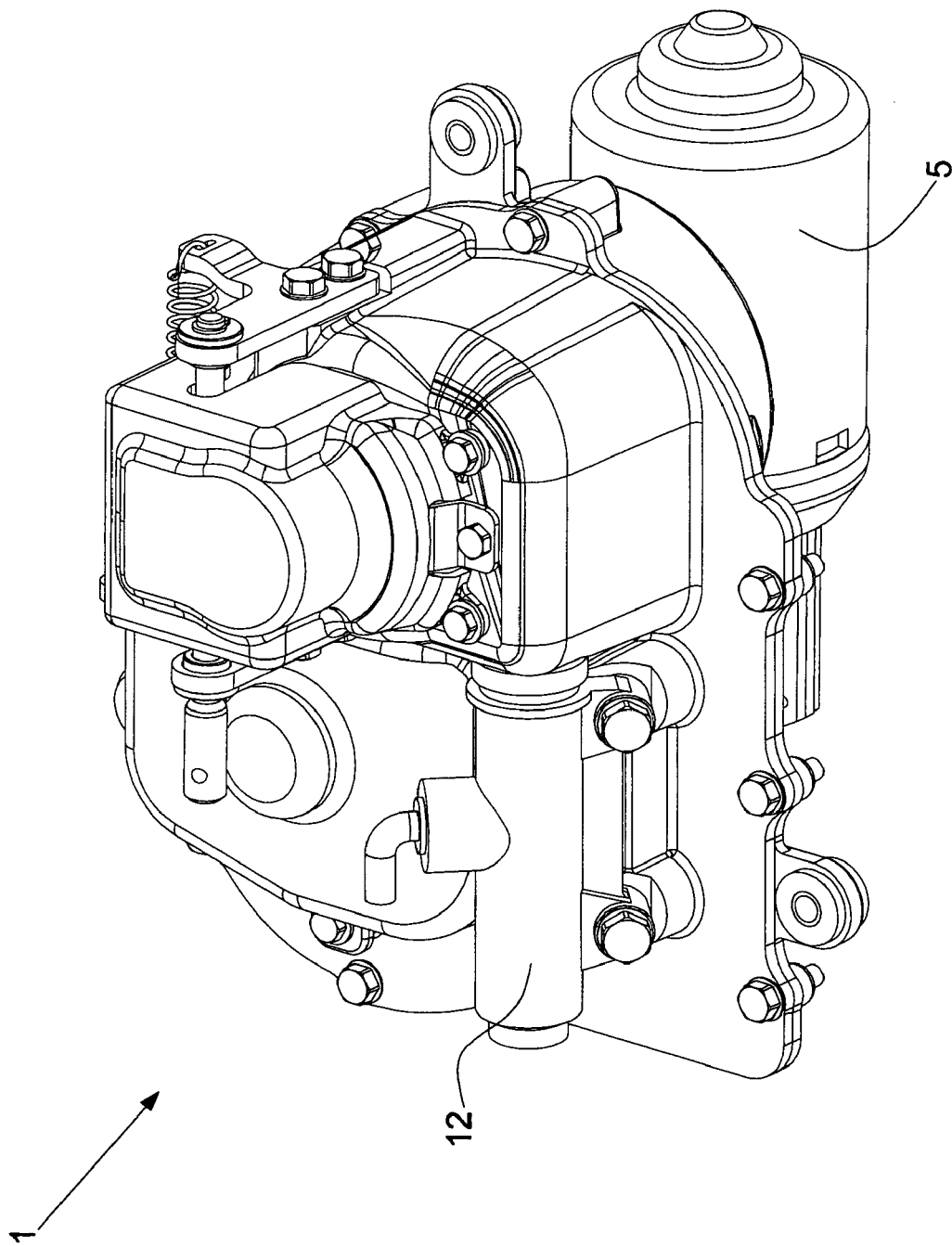
FIG. 1 is an axonometric view of a selective actuation device according to the present invention.

With reference to the figures a selective actuation device 1 is shown according to the present invention.

From here onwards, in order to better understand the invention, the description will concern the application on a rolling three-wheel vehicle with two-front-wheel steering and one rear wheel.

In particular, the selective actuation device will control the possibility of simultaneously activating or excluding one or more operating groups, according to the user's needs.

In detail, the operating groups simultaneously controlled by the device according to the present invention are represented by cable 9 and brake element 10 of the rear parking brake of the vehicle and by a hydraulic group, which is, in turn composed of a pump 12 and a hydraulic circuit 13 for the activation of at least one suspension stroke stop device 14, 14' and a stop device 3 of an anti-roll system.

Suspension stroke stop devices and the above-mentioned type of stop device for the anti-roll system are, for example, described in patent applications ITMI2004A000172 and ITMI2004A000171 respectively, on behalf of the same applicant.

Although the present invention is directed to above-mentioned operating groups, it is clear that the invention should not be restricted to this specific use.

Figure 5:
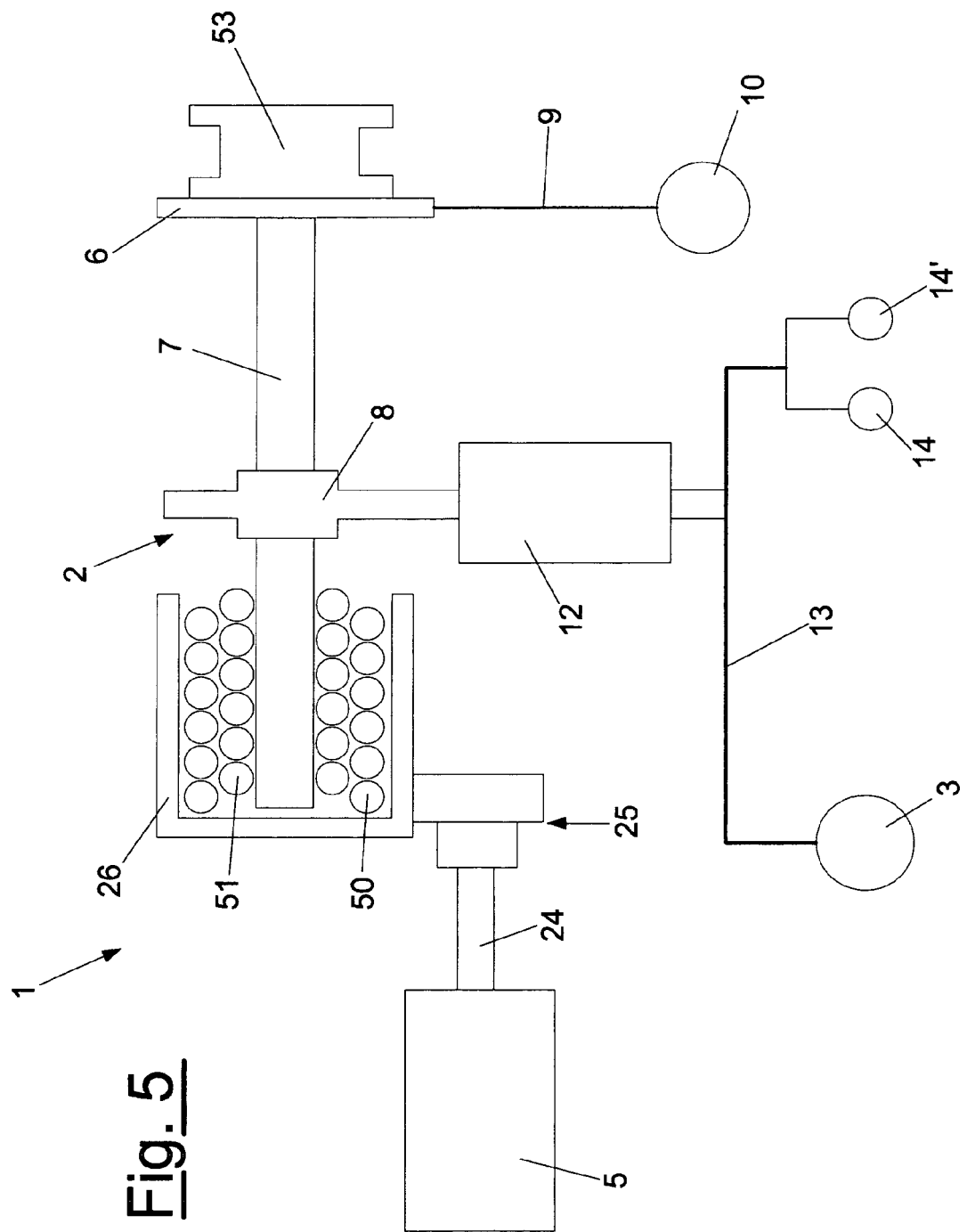
FIG. 5 is a schematic block diagram of the selective actuation device according to the present invention.

According to a preferred embodiment, shown in the figures, actuation device 1 includes an actuator 5 that acts on a actuation mechanism 2. Such mechanism 2 includes a pusher element 8 for actuating a first operating group 12, 13 and a rotating element 53. The rotating element 53 moves between an activation mode, where it acts on a second operating group that actuates the rear parking brake of the vehicle, and a rest mode, where the activation of the first operating group 12, 13 is disengaged by the second operating group. Actuation device 1 is, moreover, equipped, as is better shown in FIGS. 2 and 5, with at least one elastic means 50, 51 interposed between the pusher element 8 and the actuator 5 to keep the actuation device constantly charged.

In other words, during the activation of the operating groups the action of elastic means 50, 51 eliminates or considerably reduces the initial inertia of the components in actuation device 1.

To this end, the elastic means include at least one pair of helicoidal springs 50, 51 responsible for the activation of the pusher element 8 and a shaft 7, which is operatingly connected to the second operating group 6, 9, 10 when the pusher element 53 is activated.

In particular, by means of a driving shaft 24, the actuator 5 moves a toothed pinion 25. The latter, by transmitting movement to a toothed sector 26, see FIG. 2, moves the spring pair 50 and 51. The spring pair 50, 51 rotates, as was previously mentioned, both the shaft 7 and the pusher element or lever 8 which acts on the first operating group 12, 13.

The first operating group is represented, as above-mentioned, by an oil pump 12 which, by acting, in turn, on the hydraulic circuit 13, activates a blocking device 3 of an anti-roll system and the front suspension stroke stop devices 14, 14'.

The toothed sector 26 acts both on spring 51 and on spring 50.

The helicoidal spring 50 is, thus, held fast at one end with the toothed sector 26 and at the other end with pusher element 3.

Whereas, the spring 51 is held fast at one end with the toothed sector 26 and held at the other end with the shaft 7, which supports a toothed element 53 integral therewith.

As above-mentioned, the toothed element 53 has the peculiarity of being mobile and can therefore be inserted in "activated" mode or removed in "rest" mode.

The insertion or removal of element 53 takes place through a special release lever 52.

The activation of the toothed element 53, integral with the shaft 7, makes it possible for the same element 53 to "engage" element 6, enabling the activation of the rear brake cable 9, thanks to the rotation of the shaft 7. The rear brake cable 9, in turn, acting on the braking element 10 of the rear parking brake, blocks the rear wheel of the vehicle.

Figure 2:
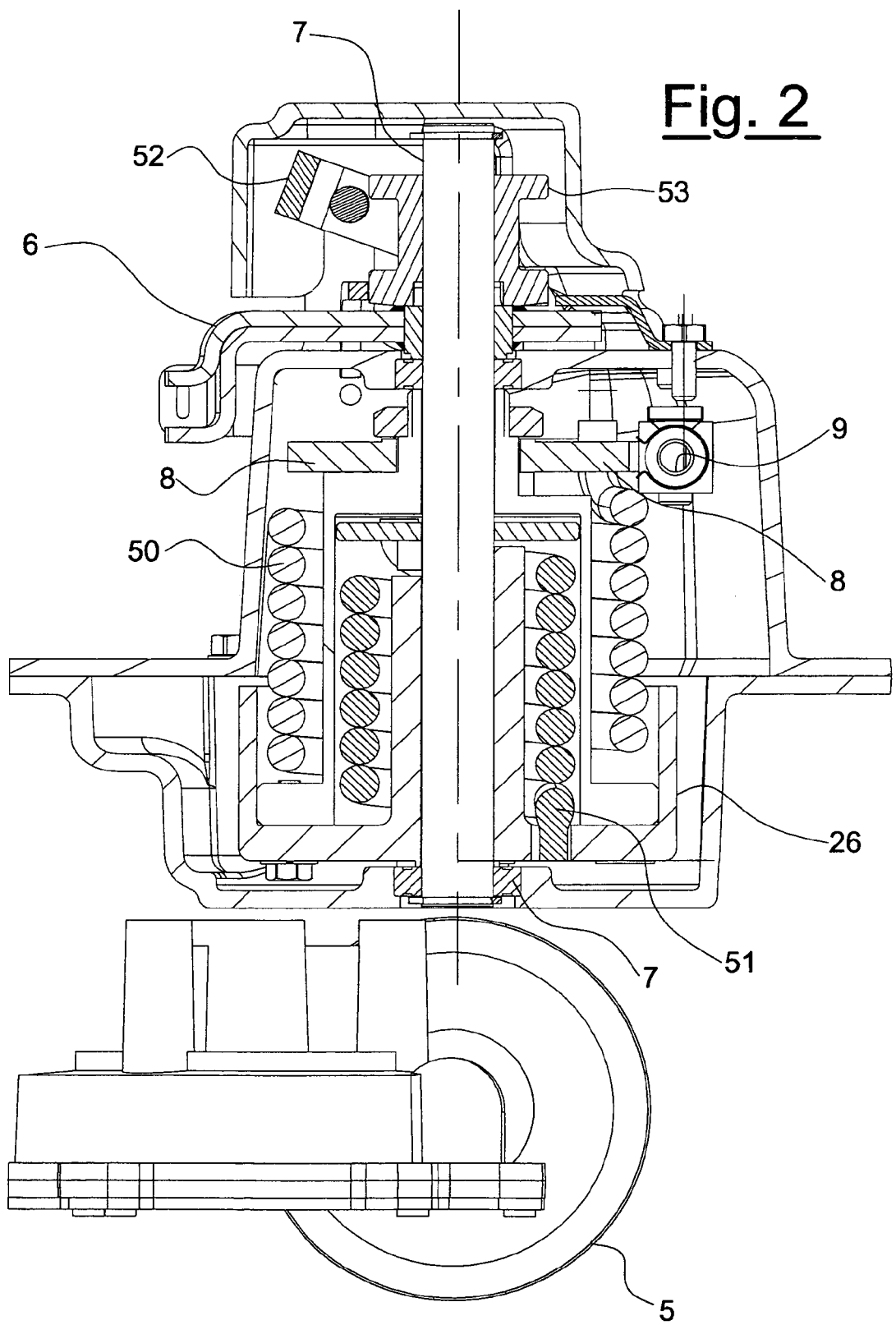
FIG. 2 is a section view of the selective actuation device according to the present invention.
Figure 3:
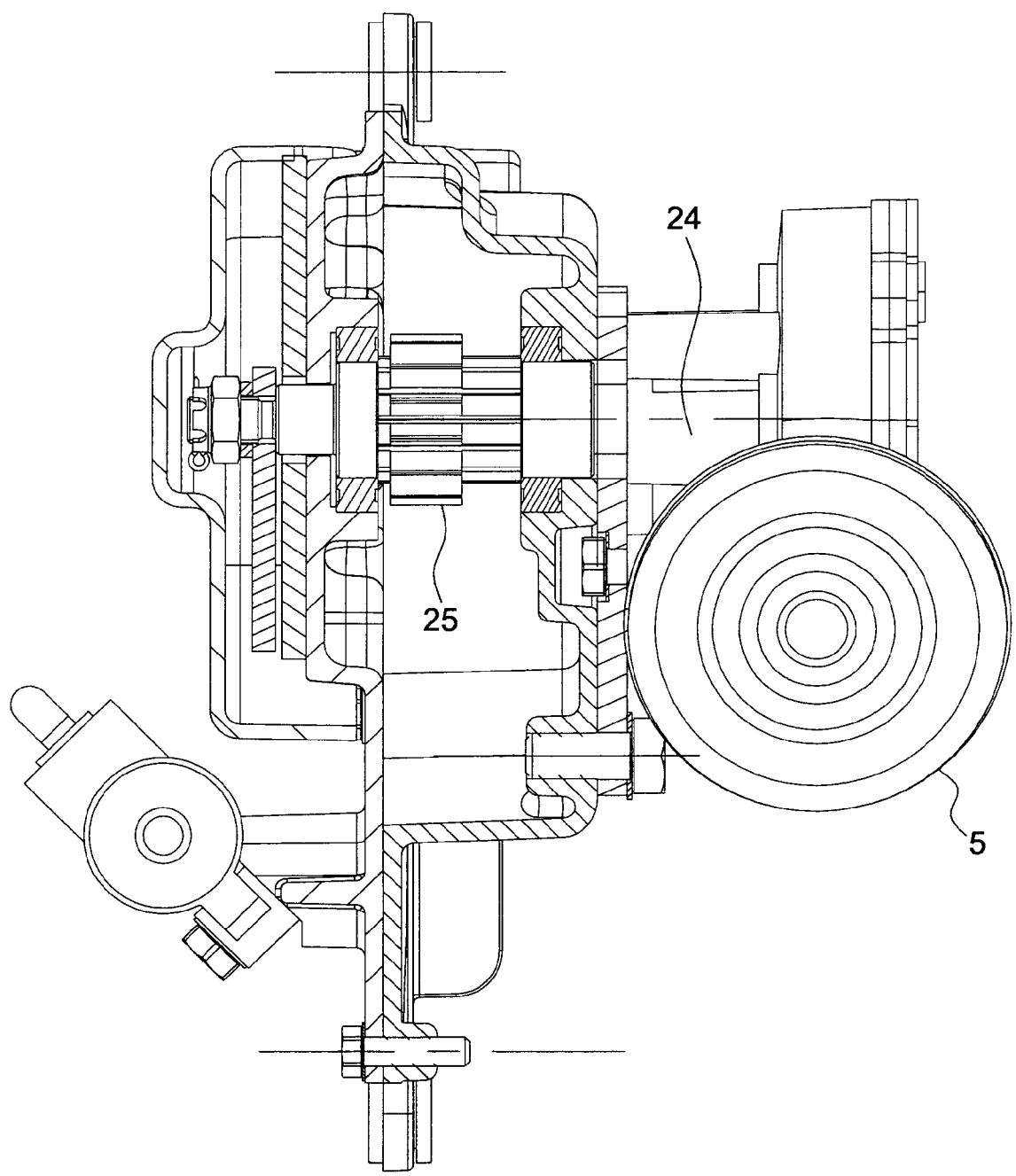
FIG. 3 is a different section view of the selective actuation device according to the present invention.

In other words, when activated mode, the toothed element 53 is integral, as shown in FIG. 2, to element 6 and henceforth, its rotation, activated by the rotation of the shaft 7, moves element 6 which brakes the rear wheel of the vehicle.

With toothed element 53 in activated mode, the selective actuation device according to the present invention allows to simultaneously activate the blocking element 3 of the anti-roll system of the vehicle, the front suspension stroke stop devices 14, 14' and the rear wheel braking.

It has been mentioned that the toothed element 53 also has a rest position: this position serves to exclude the rear wheel braking (for example if the vehicle must be moved while the anti-roll system is activated). This condition is activated through the release lever element 52 which, if activated, "lifts" the shift 7 so that the toothed element 53 no longer engages with element 6.

This condition makes it possible for the rear braking element 10 to disengage from the shaft 7. In this case, the rotation of the toothed sector 26 activates the blocking device 3 for the anti-roll system and the stroke stop device 14, 14', but not the blocking of the rear brake.

It is noted, however, that under no condition does the activation of the rear brake in a known manner, that is through either a manual or a foot lever, not shown, also implies the activation of the pump 12.

The release lever 52 is, in turn, activated to control the position of the toothed element 53, by special control means, not shown, such as a control directly actuated by the user through a lever, button or the like.

Figure 4:
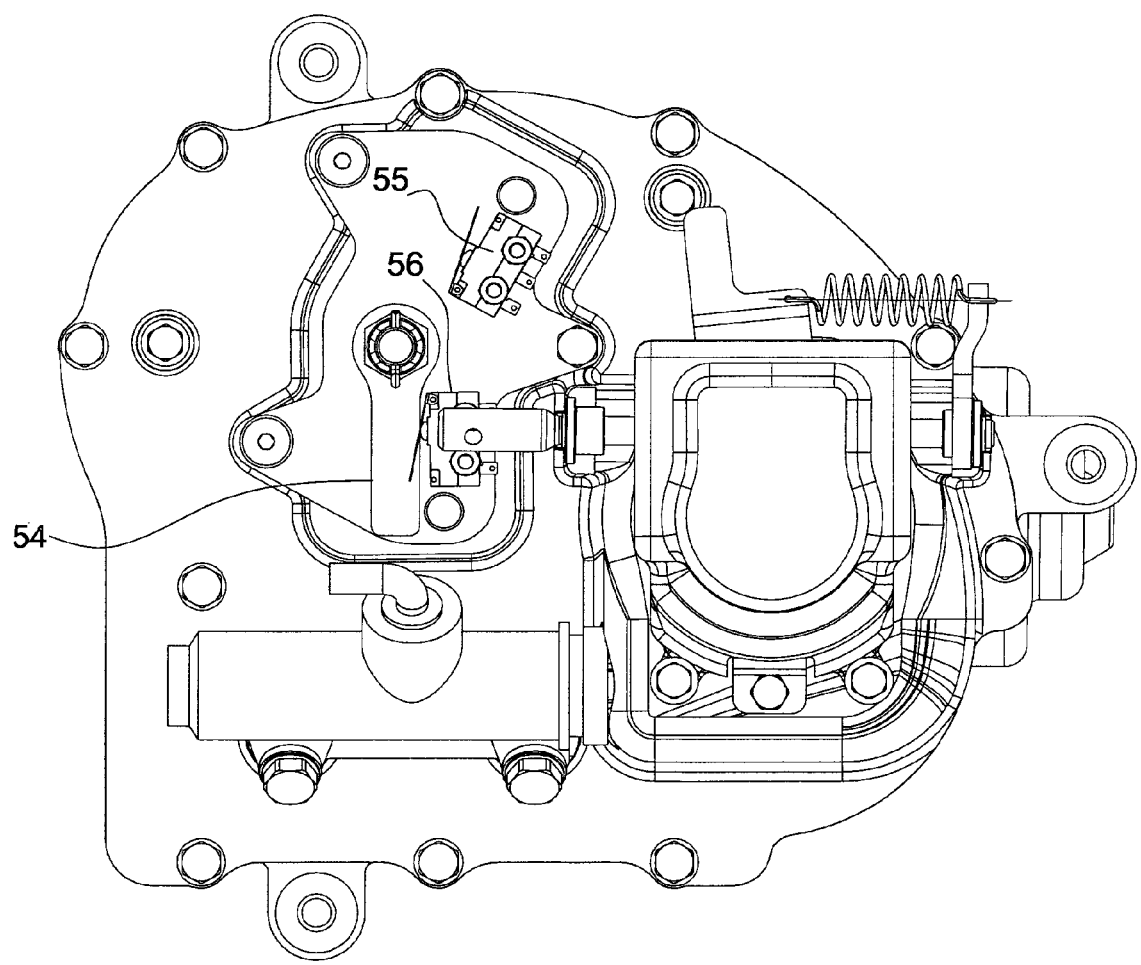
FIG. 4 is a section view from above of the selective actuation device according to the present invention.

According to an advantageous aspect of the present invention, the shaft 7 is provided with a lever 54 (see FIG. 4) that acts as a switch, in the sense that it acts on two microswitches 55 and 56, which signal a switchboard when the actuation device is in "stop" mode.

The present invention has been described for the purpose of illustration, but not in a limitative sense according to its preferred embodiments, but it should be understood that variations and/or modifications may be made by those skilled in the art without departing form the scope of protection, as defined by the attached claims.

The invention claimed is:

1. Actuation device (1) provided with at least one actuator (5) acting on a actuation mechanism (2), comprising at least one pusher element (8) for activating a first operating group comprising a pump (12), and a hydraulic circuit (13) and a rotating element (53) that moves between an activation mode, in which it acts on a second operating group (9, 10), and a rest mode where the activation of said first operating group comprising the pump (12), and the hydraulic circuit (13) is disengaged from said second operating group comprising a cable (9), and a braking element (10) of a rear parking brake, said actuation device comprising at least one elastic means (50, 51) interposed between said pusher element (8) and said at least one actuator (5) in order to keep the said actuation device (1) constantly charged wherein said at least one actuator (5) acts on a toothed sector (26) by means of a drive shaft (24) and a toothed pinion (25) and said at least one elastic means includes at least one pair of helicoidal springs (50, 51), responsible for the activation of said pusher element (8) and a shaft (7), on which the toothed sector (26) acts and said toothed sector (26) is held fast one of the pair of helicoidal springs and transmits the movement to said pump (12) by means of said pusher element (8) and said toothed sector (26) is held fast an other of the pair of helicoidal springs (51) and when the rotating element (53) is in said activation mode, transmits movement to an acting element (6) through said shaft (7) to activate said cable (9) and said braking element (10) of a rear wheel parking brake.

2. Actuation device (1) according to claim 1, characterized in that said first operating group (12, 13) comprises said pump (12) connected to said hydraulic circuit (13) acting on at least one blocking device (3) of an anti-roll system of a vehicle.

3. Actuation device according to claim 1, characterized in that in said activation mode said rotating element (53) couples with a corresponding element (6) acting on said second operating group (9, 10).

4. Actuation device according to claim 3, characterized in that said rotating element (53) comprises a toothing adapted to couple, in said activation mode, on a corresponding toothing of said activating element (6).

5. Actuation device (1) according to claim 1, characterized in that said rotating element (53) is moved from said activated mode to a stop mode by means of a release lever (52).

6. Actuation device (1) according to claim 5, characterized in that said release lever (52) is activated to control the position of said rotating element (53) by appropriate control means.

7. Actuation device (1) according to claim 6, characterized in that said control means comprise a lever, button manual or foot control.

8. Actuation device (1) according to claim 1, characterized in that said shaft (7) activates a lever (54), in order to activate at least two microswitches (55) and (56) which signal a control switchboard that said actuation device is in "stop" mode.

* * * * *